United States Patent Office 3,032,129
Patented May 1, 1962

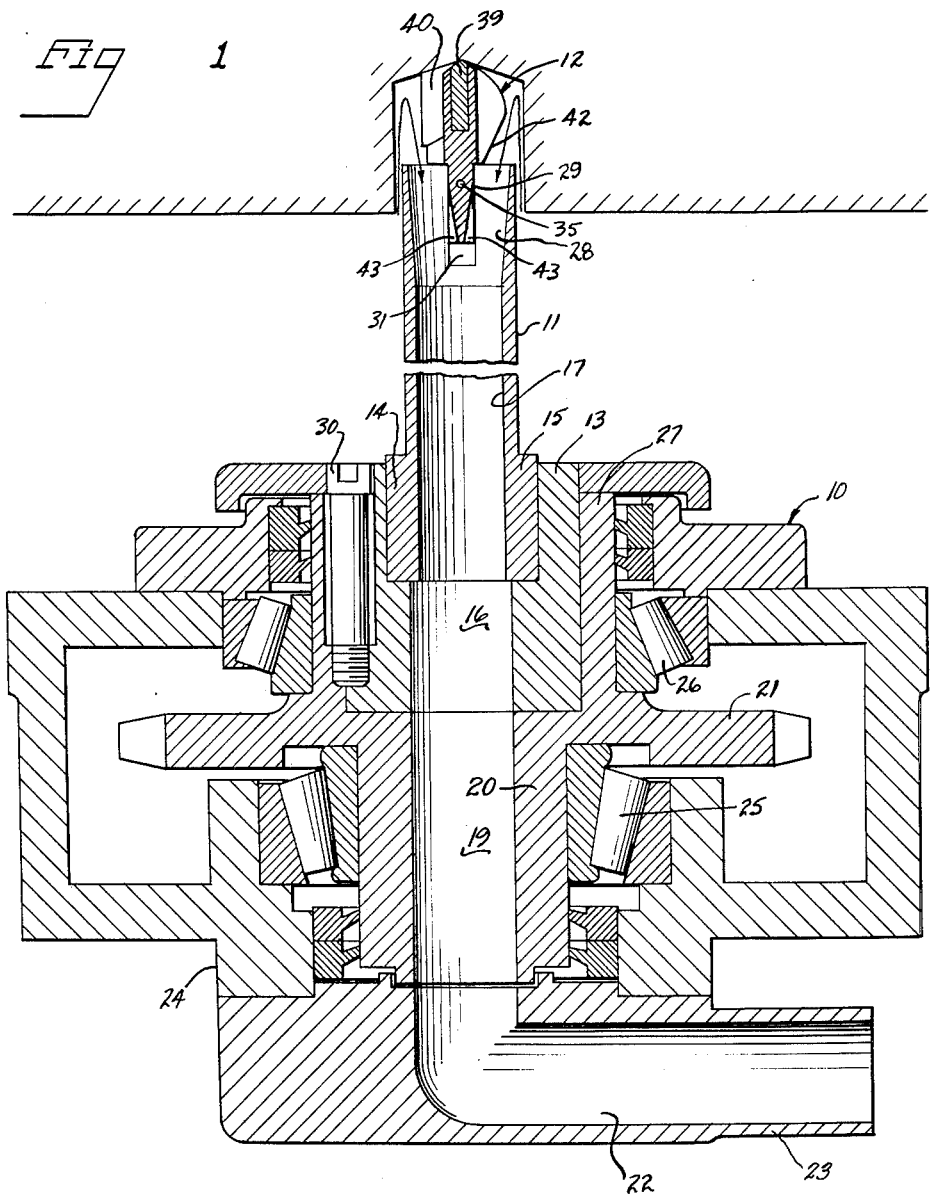

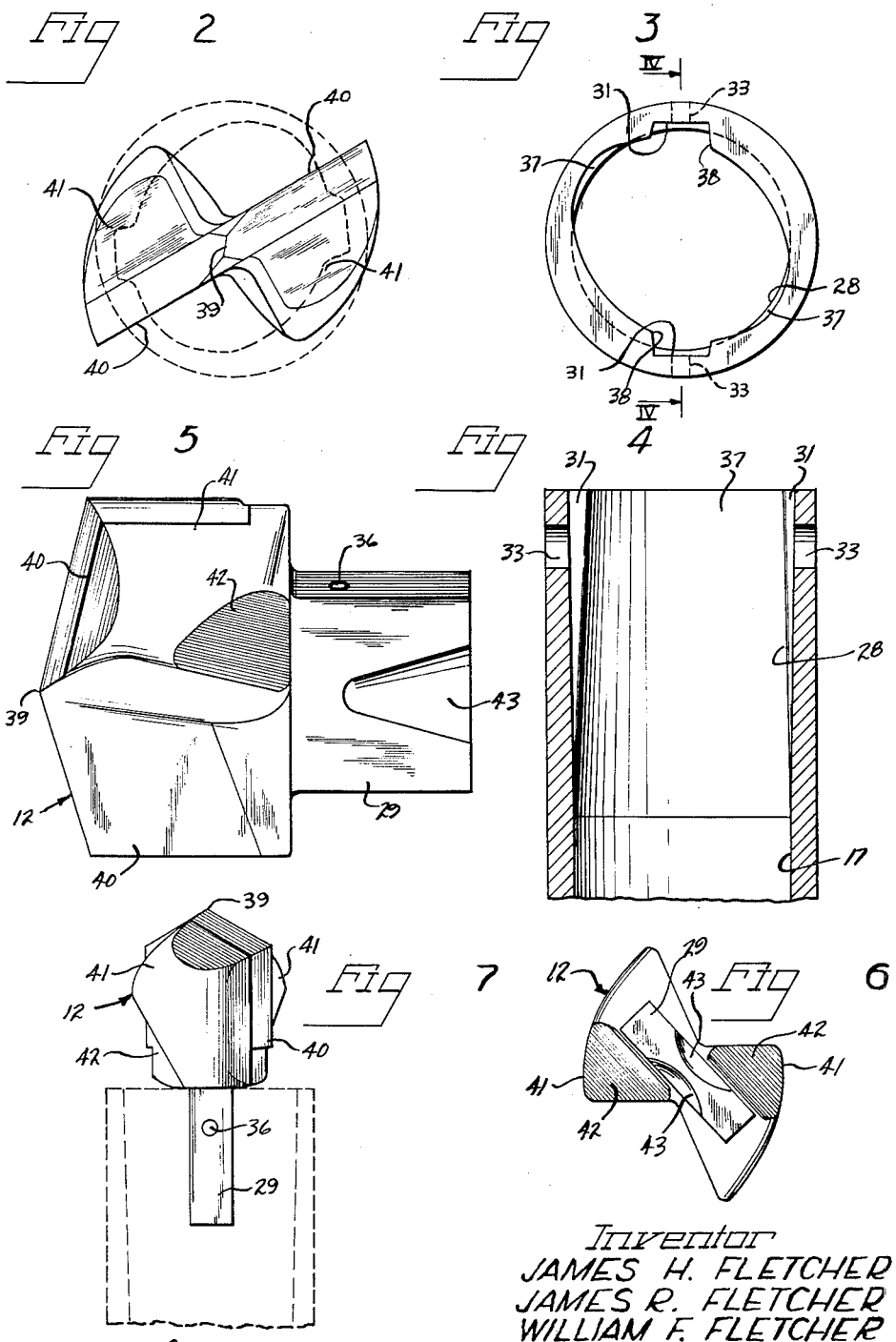

3,032,129
DUST COLLECTING DRILL STEEL AND BIT
James H. Fletcher, Wilmette, Ill., and James R. Fletcher and William F. Fletcher, Huntington, W. Va., assignors to J. H. Fletcher & Co., Huntington, W. Va., a corporation of Illinois
Filed May 1, 1959, Ser. No. 810,368
6 Claims. (Cl. 175—320)

This invention relates to improvements in dry rotary drilling apparatus designed for drilling relatively short small diameter holes in rock and the like, such as those required for blasting or for installing mine roof bolts, and more particularly relates to a simplified drill bit and steel so arranged as to accommodate the efficient collection of the cuttings and dust by suction during the drilling operation.

A principal problem in collecting cuttings resulting from drilling small holes in rock and the like has been the necessity of rapidly removing the large cuttings at the drilled face so the drilling operation will not be retarded by "choking up" of the drill bit or drill steel, as occurs when the mass of the bit moves into an area where the cuttings plus bit mass completely fill the drilled hole. Slow or partial removal of cuttings or removal of the cuttings from the hole at a substantial distance behind the cutting edge of the bit, greatly increases the torque required to rotate the drilling tool by wedging the cuttings between the wall of the hole and the drill stem, or between the drill bit body and the wall of the hole. Also, the cutting action is retarded and the amount of thrust required to properly cut a given variety of rock is increased if cuttings are not removed close to the freshly cut end of the hole, but instead are packed between the face of the drill body and the end of the hole. The problem becomes particularly critical where penetration rates of 5′ per minute or greater are required, as is the case in small hole drilling today.

The bit and drill steel herein described have the following advantages not obtainable in other known apparatus designed to serve a similar purpose:

(1) The method of connection between the bit and steel provides a means for transmitting the torsional force from the steel to the bit, leaving a maximum open area in a cross sectional plane, throughout the length of the bit shank.

(2) The tubular drill steel is so formed at the bit socket end that a substantial percentage of the tube is open to directly receive cuttings made by the bit as the cuttings move back from the cutting edge, when the bit is in place in the steel.

(3) The drill steel can be made from a tube of a relatively large diameter and thin wall section. The thickness and diameter of the drill steel may be so proportioned with respect to the hole being drilled that both the area between the outside of the tubing and the drilled hole, and the hollow interior area of the drill steel or tubing, remain substantially equal throughout the length of the drill steel. This provides maximum air passageway into the hole and out through the drill steel. The tube can remain substantially unobstructed by the bit shank due to the provision of an internal key type bit socket in the tube.

(4) The bit shank and bit socket are so contoured that air drawn into the tubular drill steel is not substantially compressed between the bit shank and the inner wall of the tube, thereby eliminating a sharp velocity drop which can and does cause a clogging point due to piling up of cuttings carried by the air-stream.

(5) The bit shank is so shaped that the driving force transmitted to it by the drill steel are carried on the outer edges only of the bit shank, leaving a space between the body of the bit shank and the hollow interior portion of the drill tube permitting large cuttings to pass between the shank and the inner walls of the drill tube.

(6) The contouring of the bit in relation to the bit shank permits large unobstructed open areas at the end of the drill steel tube when the bit is in place in the drill.

The principal object of the present invention, therefore, is to provide a simplified, improved and more efficient method and apparatus for collecting the cuttings of drilling through the center of the drill steel in small hole drilling.

A further object of the invention is to provide a novel and improved form of drill bit particularly adapted for rotatably drilling in rock and the like, and so arranged as to provide a maximum cuttings removal area close to the cutting tip of the bit, accommodating the bit to be carried by a hollow drill steel, and accommodating the cuttings to be removed by suction through the interior of the drill steel.

A further object of the invention is to provide a novel and improved form of drill steel, so arranged as to accommodate the removal of cuttings through the interior of the drill steel, and providing a maximum open area at the end of the drill steel close to the cutting tip of the bit, accommodating air to be drawn into the steel by suction, and reversing the direction of the air as it enters the steel, closely adjacent the point of drilling.

These and other objects of the invention will appear from time to time as the following specification proceeds and with reference to the accompanying drawings wherein:

FIGURE 1 is a partial fragmentary sectional view showing the drill steel and bit carried in a drilling head, and drilling a vertical hole in a mine roof, with the drilling head and parts of the drill steel and bit shown in vertical section;

FIGURE 2 is a top plan view of the drill bit, with the drill steel end in phantom below it;

FIGURE 3 is a top plan view of the drill steel with the drill bit removed and the drive nut broken away;

FIGURE 4 is an enlarged fragmentary sectional view of the driving end of the drill steel taken substantially along line IV—IV of FIGURE 3;

FIGURE 5 is an enlarged view of the drill bit, showing the drill bit in side elevation;

FIGURE 6 is a bottom plan view of the drill bit; and

FIGURE 7 is an end view of the drill bit, with the drill steel end shown in phantom.

In the embodiment of the invention illustrated in FIGURE 1 of the drawings, 10 generally designates a drill head having an internal air passageway connecting through a drive socket 13 at one end and with the hollow interior portion of a hollow drill rod 11, and at the other end with a source of vacuum of any well-known form (not shown). The head is herein shown as being of a type carried on a drilling machine for movement along vertical guides (not shown) for advancing the drill steel 11 and a drill bit 12 on the end thereof, to drill a vertical hole in a mine roof. The drilling head 10 and drilling machine for guiding and feeding the drilling head vertically may be like that shown in Patent No. 2,832,567 which was issued to James R. Fletcher and William F. Fletcher on April 29, 1958, and are no part of our present invention so need not herein be shown or described further.

As shown in FIGURE 1, the drilling head 10 includes the drive socket 13 opening to the top of the drilling head, and having an interior wall 14 of an irregular configuration, to receive a drive nut 15 on the lower end of the drill steel 11 for driving said drill steel as the drive nut 15 is inserted within the drive socket 13. The drive socket 13 has a reduced diameter passageway 16 leading from the wall 14 and having communication with a hollow interior portion 17 of the drill steel. The hollow interior portion 16 of the drive socket 13 in turn has communication with an aligned vacuum passageway 19 in a hub 20 of a drive sprocket 21 for rotatably driving the drive socket 13 and drill steel 11. The vacuum passageway 19 in turn has communication with a vacuum passageway 22 in a vacuum fitting 23, secured to the underside of a housing 24 for the drilling head, and suitably sealed thereto. The fitting 23, in turn has connection with a source of vacuum, which may be a vacuum pump (not shown) of any well known form, and is no part of the present invention so need not herein be shown or described further.

The drive sprocket 21 is shown as being journalled in a roller bearing 25 mounted in the housing 24 for the drilling head and on the hub 20, and on a roller bearing 26 mounted on an upwardly extending hub portion 27 of the drive sprocket 21 and in the housing 24.

The hub 27 forms a mounting for the socket 13. A threaded drive pin 30 threaded within the hub 27 and the socket 13, is provided to key said socket to the hub 27 and effect a drive to said socket upon driving movement of the sprocket 21. The sprocket 21 in turn may be driven from a motor (not shown), mounted on the drilling apparatus, through a suitable geared reduction and chain and sprocket drive (not shown), and no part of the present invention.

The drill steel 11 is shown as being tubular in form, welded or otherwise secured to and extending upwardly from the drive nut 15, and having a relatively large diameter interior portion 17 of a uniform diameter throughout the length thereof to a drill socket 28. The internal diameter of the drill steel is as large as is consistent with the tube dimensions required to take the thrust and torsional stress of drilling, when drilling in rock and the like.

The upper or bit socket end of the drill steel has key slots 31 recessed within inner side wall of the drill socket 28 in diametrically opposed relation with respect to each other, to receive and form a drive means for a shank 29 of the drill bit 12.

The shank 29 of the drill bit 12 is herein shown as being oblong in form, and as being relatively thin in cross section, in proportion to the body of the bit, to provide a maximum cuttings passageway area between opposite sides of said shank and the interior of the drill steel 11. The drill steel 11 is cross-drilled adjacent the outer end thereof, as indicated by reference character 33. The cross-drilled portion of the drill steel intersects the key slots 31 and is provided to receive a pin 35 registrable with a drilled hole 36 extending through the shank 29 of the drill bit 12, to retain the drill bit to the drill steel as the drill steel is being withdrawn from its hole.

The drill steel 11 is also shown as having recessed portions 37 recessed inwardly of the wall thereof, eccentrically of the center thereof and extending along opposite sides of the shank 31 of the drill bit 12, to provide enlarged cuttings received areas extending from cutting blades 40 of the bit 12 along opposite sides of said shank, to accommodate the cuttings to be drawn along the cutting blades of the bit inwardly into the drill steel by the reversal of the air at the inner end of the hole being drilled and to be drawn along the drill steel by suction, as indicated by the arrows in FIGURE 1. It will be noted that the recessed portions 37 are so formed as to provide thickened portions 38 at the driving ends of the key slots 31 to provide relatively wide driving surfaces in driving engagement with the ends of the shank 29 of the drill bit 12. The key slots 31 and recessed portions 37 may be machined or may be formed in the drill steel by forging or pressing operations, or in various other well known manners.

Referring now in particular to the novel form of drill bit of our invention, cooperating with the drill steel 11 to provide a maximum open area between the shank of the bit and the inside of the drill steel, as the air enters the drill steel closely adjacent the cutting surface of the bit through a turn of 180°, the drill bit 12 is herein shown as having a well known form of spear-point cutting tip 39 and is in the general form of a figure 8 in plan (FIGURE 2). The bit 12 includes cutting blades in the form of hardened cutting inserts 40, recessed in and backed up by back up lugs 41. Said back up lugs taper downwardly and inwardly from maximum thickness intermediate the ends thereof substantially to the shank 29 at the juncture with shank 29, as indicated by reference character 42 in FIGURE 7. The back up lugs 41 and their cutting inserts 40 are so arranged with respect to the shank 29 and the recessed portions 37 as to cooperate with said recessed portions to provide maximum flow areas for the cuttings along said recessed portions and shank.

The bit 12 is preferably a forging and the cutting blades or inserts 40 may be conventional hardened cutting inserts, which may be formed from a tungsten carbide or from any other similar hard cutting and abrasive resistant material, and which may be retained to the back up lugs 41 by brazing or like operations, as is well known to those skilled in the art, so not herein shown or described further.

The cutting inserts 40 likewise project a slight distance beyond the back up lugs 41 of the bit, to cut clearance for the bit during the drilling operation.

The shank 29 of the drill bit is spooned out to form recesses 43 in its longest faces, in alignment with the recessed portions 37 of the drill steel 11, when the bit is in position in said drill steel and the shank 29 is in engagement with the key slots 31 at opposite ends of the longest faces thereof. The spooned out recess 43 in the shank 29, as herein shown, lead inwardly from the cutting blades of the bit and increase in cross-sectional area as they progress to the end of the shank 29, and open to the end of said shank. The cutting inserts 40 are set at an angle to the plane of the shank 29 and the thrust of drilling is placed on the heavy stock of the tube end between the key ways 31 extending axially thereof, and said cutting blades cooperate with the recessed portions 37 of the drill steel and are so arranged with respect to the hollow interior portion of the drill steel as to permit the clear passage of cuttings from the leading edges of the cutting blades to the interior of the steel 11 along the recessed portions 37 thereof, as shown in FIGURE 2.

The drive at opposite ends of the longest faces of the shank together with the recessed portions in the shank, therefore, provides a maximum unrestricted area at the open end of the drill steel consistent with the required strength to take the thrust and torsional stresses of drilling, and thereby accommodates the drawing in of the relatively large cuttings through the end of the drill steel along the hollow interior portion thereof, as the air turns through 180° and enters the end of the drill steel.

It should here be noted that the drill bit 12 has a relatively short cutting surface, which terminates substantially at the shank 29, thereby positioning the open portion on each side of the shank closely adjacent the cutting surfaces of the bit and accommodating the air drawn into the drill hole by suction within the drill steel, to reverse its direction of travel and draw the cuttings within the drill steel for discharge through the center thereof.

In the operation of drilling a vertical hole in a mine roof, the drill steel 11 with the bit 12 on the end thereof is inserted in the socket 13 in the drilling head 10 and rotatably driven from said socket. At the same time, the interior 17 of the drill steel is connected with a source of suction through the aligned passageways 16, 19 and 22. As the drill advances into the rock face, air will be drawn into the drilled hole by suction along the exterior of the drill steel and will reverse its direction of travel at the end of the drill steel and hole, providing a suction area adjacent the cutting surfaces of the bit. The dust and chips of rock cut during drilling will thus be entrapped immediately upon formation in this suction area and drawn into the space between the interior of the drill steel and opposite sides of the shank of the bit, for removal through the center of the drill steel.

It should here be understood that the drill bit and steel and cuttings collecting system of our present invention may drill and collect the cuttings and dust from vertical as well as horizontal holes and that in either case the proportionally large cuttings receiving areas at the end of the drill steel are closely adjacent the cutting surfaces of the bit, to accommodate the efficient drawing of the relatively large cuttings into the hollow interior of the drill steel, with no short circuiting of the air as it enters the drill steel.

It should further be understood that the outside diameter of the drill steel is substantially hole size and that the areas on opposite sides of the shank 29 of the bit 12 and the hollow interior of the drill steel, are sufficiently large that they balance the areas between the wall of the hole and the external wall of the drill steel, to accommodate a maximum amount of air to be drawn into the drill steel and to reduce eddy currents as the air turns through 180° and draws the cuttings into the hollow interior portion of the drill steel.

While we have herein shown and described one form in which our invention may be embodied, it will be understood that various modifications and variations thereof may be effected without departing from the spirit and scope of the novel concepts of the invention as defined by the claims appended hereto.

We claim as our invention:

1. A rotary drilling and cuttings collecting apparatus comprising a. A hollow drill steel having drive means at one end thereof and internal keyways at the opposite end thereof
   b. a drill bit having a cutter end portion having oppositely extending cutting blades and having
   c. an oblong shank extending from said cutting blades and adapted to register with the internal keyways in said hollow drill steel,
   d. said shank having inwardly recessed portions extending along opposite sides thereof from positions closely adjacent said cutting blades and opening to the inner end of said shank,
   e. said shank being set at an angle to the cutting blades of the bit and cooperating therewith to provide relatively large unobstructed openings into the drill steel along said cutting blades and opening to the hole being drilled closely adjacent the cutting tip of the bit, to accommodate the free drawing of cuttings into said drill steel by suction, during the operation of drilling.

2. A rotary drilling and cuttings collecting apparatus comprising a. a hollow drill steel having drive means at one end thereof and internal keyways at the opposite end thereof,
   b. a drill bit having a narrow rectangular shank having a cutter end portion extending therefrom,
   c. said cutter end portion being contoured in plan in the general outline of the outer margins of a figure 8 and having oppositely extending cutting blades having back up lugs extending therefrom
   d. said back up lugs converging to positions adjacent said shank,
   e. said shank being set at an angle to the cutting blades of the bit and being adapted to engage said keyways along its opposite sides,
   f. and said cutting blades and the diverging portions of said backup lugs being so arranged with respect to said shank as to provide maximum unobstructed openings into the drill steel at the outer end of the drill steel and closely adjacent the cutting tip of the bit, to accommodate the free drawing of the cuttings into the drill steel by suction during the drilling operation.

3. A rotary drilling and cuttings collecting apparatus comprising a. a hollow drill steel having drive means at one end thereof and internal keyways at the opposite end thereof,
   b. a drill bit having a narrow rectangular shank having a cutter end portion extending therefrom,
   c. said cutter end portion being in the general outline of the outer boundaries of a figure 8 in plan and having oppositely extending cutting blades extending generally vertically when the bit is cutting in a vertical direction and back up lugs backing up said cutting blades and extending therefrom,
   d. said back up lugs converging from portions intermediate their ends to opposite sides of said shank,
   e. said shank having recessed portions in opposite sides thereof diverging from positions closely adjacent said cutting blades to the inner end of said shank,
   f. said shank engaging said keyways outwardly of said recessed portions and cooperating with the hollow interior portion of said drill steel to be driven therefrom and being set at an angle to said cutting blades to provide maximum unobstructed openings into the drill steel along said cutting blades closely adjacent the cutting tip of the bit, to accommodate the free drawing of cuttings into the drill steel by suction during the operation of drilling.

4. In a rotary drilling and cuttings collecting device, a. a one-piece drill steel of tubular form having a driving nut on one end, and a bit socket at its opposite end extending within said drill steel for a portion of the length thereof,
   b. said drill steel being of substantially unchanged cross-sectional area to the inner end of the bit socket,
   c. and having an enlarged area throughout the length of said bit socket,
   d. said bit socket having internal keyways extending therealong,
   e. a drill bit having an oblong shank engageable with said internal keyways,
   f. said keyways being cross-drilled, said oblong shank having a drilled portion registrable with the cross-drilled portions of said keyways
   g. and a retaining pin insertable through the cross-drilled portions of said keyways and the drilled portion of said shank for retaining the drill bit thereto.

5. In a rotary drilling and cuttings collecting device, a. a drill bit having cutting blades and an oblong shank extending therefrom,
   b. a one piece thin walled uniform diameter hollow drill steel having a driving nut at one end thereof and a bit socket at the opposite end thereof extending along said drill steel for a portion of the length thereof,
   c. said bit socket being enlarged eccentrically of the center thereof throughout the length of said bit socket and including
   d. diametrically opposed internal keyways adapted to register with said oblong shank,
   e. and the eccentrically enlarged portions of said bit socket being in alignment with said cutting blades, to accommodate the free drawing of the cuttings along said cutting blades into said drill steel by suction.

6. In a rotary drilling and cuttings collecting apparatus, a. a hollow drill steel having a bit socket at one end thereof having diametrically opposed keyways extending therealong,
b. a drill bit having an oblong shank and a spear pointed cutting tip having oppositely extending backup lugs on opposite sides of said cutting tip tapering inwardly toward said shank,
c. cutting blades recessed in said backup lugs and terminating into said spear pointed cutting tip,
d. said shank spanning said bit socket and being spaced inwardly from diametrically opposite sides of said bit socket and engaging said keyways at its opposite ends, to provide large area openings into said drill steel along said cutting blades and shank accommodating the drawing of the cuttings into said drill steel by suction during the operation of drilling.

References Cited in the file of this patent

UNITED STATES PATENTS

| | | |
|---|---|---|
| 2,101,566 | Vanderpool | Dec. 7, 1937 |
| 2,816,737 | Kinard et al. | Dec. 17, 1957 |

FOREIGN PATENTS

| | | |
|---|---|---|
| 540,128 | Italy | Feb. 29, 1956 |